Jan. 5, 1971 E. O. WILLOUGHBY 3,553,696
AERIAL SYSTEM FOR APPLICATION TO RADIO
PROPAGATION AND NAVIGATION
Filed June 10, 1969 3 Sheets-Sheet 1

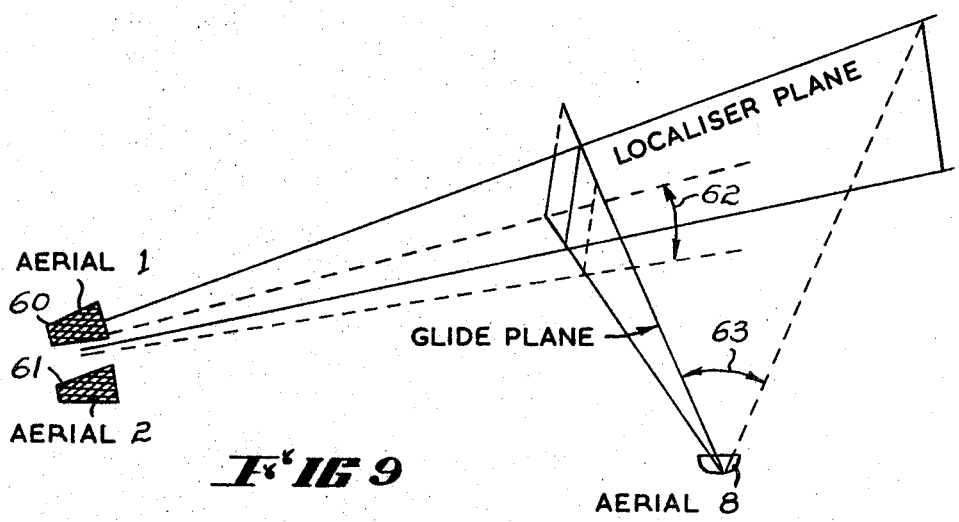
FIG 9
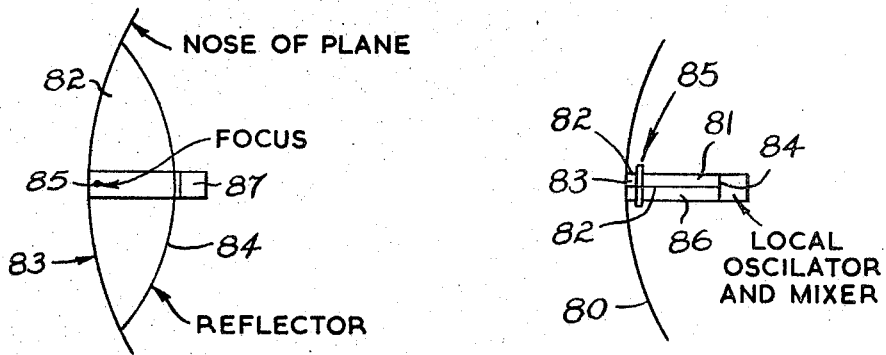
FIG 10
FIG 11

United States Patent Office 3,553,696
Patented Jan. 5, 1971

3,553,696
AERIAL SYSTEM FOR APPLICATION TO RADIO PROPAGATION AND NAVIGATION
Eric O. Willoughby, Adelaide, South Australia, Australia, assignor of one-half interest to The University of Adelaide, Adelaide, South Australia, Australia
Continuation-in-part of application Ser. No. 628,645, Apr. 5, 1967. This application June 10, 1969, Ser. No. 831,978
Claims priority, application Australia, Apr. 6, 1966, 3,918/66
Int. Cl. G01s 1/18
U.S. Cl. 343—108                  3 Claims

ABSTRACT OF THE DISCLOSURE

An aircraft landing approach system utilising pairs of aerials arranged to give a localiser plane to bring the aircraft in line with the aerodrome and further aerials to project a glide plane across the localiser plane to give aircraft height. The aerials are located on opposite sides of a runway and are switched on and off at a frequency which will not interfere with navigational modulation frequencies.

---

Figure 1:
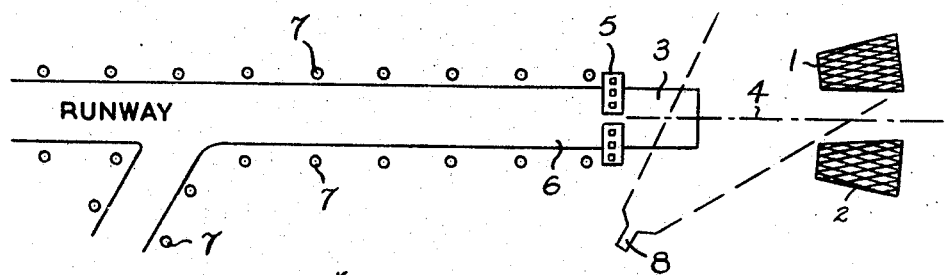

This invention relates to an improved aerial system for application to radio propagation and navigation.

This application is a continuation-in-part of application Ser. No. 628,645 filed Apr. 5, 1967 and now abandoned.

Certain problems exist with aerials for navigational guidance and similar purposes such as the need to construct the aerials with reasonable dimensions and of an order such that they do not form obstructions to flight paths or require excessive spacing in relation to runways and the like. A further problem can occur when the flight path has to extend over terrain which varies considerably, and where such flight paths must extend for considerable distances over the terrain it is a particular problem to generate a pattern which will ensure that an aircraft either approaching or leaving an airport will not deviate from its elected path and height.

The present position of the localiser aerial system at the far end of the runway impairs its effectiveness in providing accurate landing bearings in azimuth during the last 200 ft. of altitude in the descent of the aircraft.

Bends are induced in the path due to scattering off aerodrome buildings in the central areas of the aerodrome.

Further, at an elevation 50 ft. during landing with lengths of propagation path usually exceeding 10,000 ft. the angles of propagation are of the order of ¼°. Clearly, a situation requiring critical and costly levelling of the aerodrome if signal levels near the course line at low altitude are not to be affected by very small tilts of the runway reflecting surfaces. Further, such low angles of fire are very subject to propagation anomalies. Between 20 ft. and 50 ft., the situation is even more critical.

With greater reliability in radio equipment and the more difficult aerodrome sites that could require servicing in the future, a change in the approach to radio landing systems is timely.

Radio aerial systems for navigation are not well suited to precisely defining paths close to the ground and at substantial distances from themselves. These difficulties are greatly increased at higher frequencies when tropospheric effects can cause serious bending of rays of 1° or less to the ground.

The philisophy of this approach is:

(a) To define the navigation paths from touch down to within 1-4 miles from the aerodrome precisely from the aerodrome itself.

(b) These navigation paths for greater distances continue to at least 60 miles for localisers by localiser and glide aerials located at advantage points a few miles out from the aerodrome if over land, but if over sea use HF=MF surface waves to define a localiser navigation path over sea from on the beaches.

(c) Radiate localiser signals as well as a glide signal from the landing end of the runway, and in difficult topography have the pathe defining signals advanced and radiated from points of danger on the path.

(d) Arrange polar diagrams to have a very low level of fire at level incident on the ground plane and at the same time to have a low angle of elevation of the main lobe.

For glide path, this is achieved by having the vertical plane aperture of the aerial system large in terms of wavelength, and is achieved by using a frequency of the order of 5000 megacycles. Aperture distributions yielding a high ratio of main beam to side lobe level are also selected.

For 110 megacycles localiser this invention makes use of longwire or mats. It can not be too thoroughly emphasised that the generation of low angles of fire by reflection of an elevated aerial in a ground plane is impractical in almost every natural site due to the excessive lengths of flat land required for launching.

Retain as far as possible the present 110 megacycle localiser receivers which will detect the proposed localiser transmission without appreciable modification.

(f) When off the aerodrome use glide planes of low cross tilt (say 1 in 10) to intersect the localiser plane in the glide path.

Use the saturation levels of the localiser signal to block out the glide path outside this angular zone.

When applied to prescribed localiser signals for use off the aerodrome, this prevents a go lower signal at the glide plane from being obeyed on the lower side of the glide plane.

The low cross slope is of no practical significance and the actual glide plane will take over by capture effect in the neighborhood of the aerodome.

It is important to realise that at the low angles of elevation of the flight path during landing it is impossible to give efficient illumination from points far beyond touch-down, and far more satisfactory to have illumination from below the path.

Even large end fire aerials have angles of fire of the order of 10° whereas glide path angles are of the order of 2.5° to 3°.

The universal practice of placing the aerials at the far end of the runway from landing almost automatically cancels out the signal near touch down due to destructive interference of direct and reflected rays also prior to the disappearance of the signal, small irregularities on the level of the runway surface can distort the localiser course.

It is to be noted that in mat and long wire systems for low angle radiation, the area in the plane of the mat is small and the angle of elevation of the beam is determined for long waves mainly by the length and inclination of the wires. In the diamond mesh the slope of the wires to the direction of fire causes phase delay and helps lower the beam, and improves directivity in azimuth, but in the main its elevation is largely determined by the mat length and independent of ground reflection.

Aerials of λ/4 above ground will work with up to 1 foot of snow because even for large changes of Brewster angle from asphalt to snow the reflections for angles of incidence up to 5° are largely such as to augment the main beam.

The present landing position has greatly increased the difficulty of (a) providing an accurate localiser signal at landing and
(b) has enabled aerodrome obstacles to render inaccurate the instant localiser path.

The direction of the aircraft on the runway is better handled by lighted lanes which not only could define the balance of the path on the runway but could also define turn off paths to parking positions. Fog and military installations when important could be dealt with by a suitable infra-red lighting system.

The object of the present invention is to provide an improved aerial system in which the aforesaid problems will be minimised or removed and the present invention therefore relates to a system in which improved defined patterns result and in which the aerials will be relatively simple to construct and excite and will not require excessive dimensions and spacing and can be disposed on each side of the flight path and not in line with it.

The objects of the invention are achieved by utilising a system of aerials so arranged that pairs of aerials generate a localiser path medially between them, and by using intersecting radiation to generate glide paths.

To enable the invention to be fully appreciated embodiments will now be described with reference to the accompanying drawings in which are illustrated certain aspects of the invention but it is to be clear that the invention need not necessarily be limited to the details shown.

In the drawings:

FIG. 1 shows in plan a typical aerodrome equipped with the invention, the aerodrome here comprising a light-defined runway, at the approach end of which are a pair of aerials which produce the localiser path to line up the aircraft with the runway, the glide path being defined across the localiser path by an aerial generating a substantially horizontal null plane.

Figure 2:
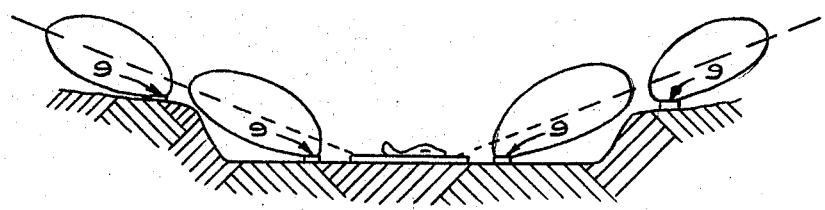
Figure 3:
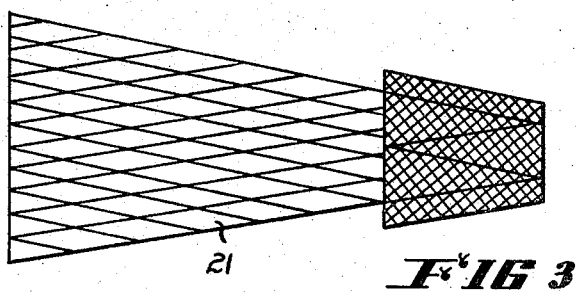
Figure 4:
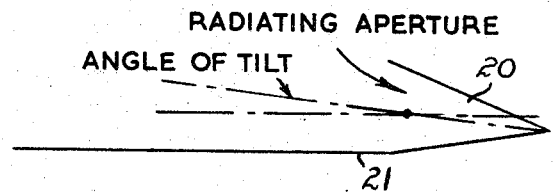
Figure 5:
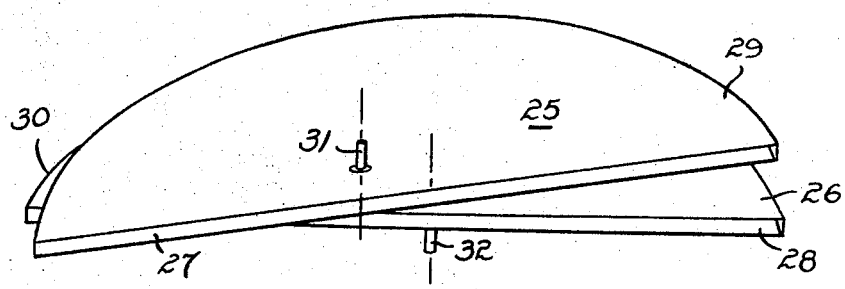

FIG. 2 is a side view showing how the invention operates in difficult terrain, where points more remote from the runway require to have a strong localiser path defined, FIGS. 3 and 4 show a doubled-back mat aerial in plan and elevation respectively, showing how an angle of tilt is obtained and showing the radiating aperture of such a system, FIG. 5 shows an aerial using what I term "cheeses," that is an aerial using long narrow cavities with a rear reflector, the apertures of the cavities of each section being angled with respect to the other, central excitation being shown in this illustration to produce what I term a "half" cheese. It is to be noted that the excitation axes are offset to bring the summing line forward of the individual apertures.

To generate a highly effective equal signal null plane over appreciable angles in azimuth it is essential to have an axis of symmetry from which to launch the radiation. The summing of the radiations from the two cheeses in a common sum aperture serves this purpose.

Figure 6:
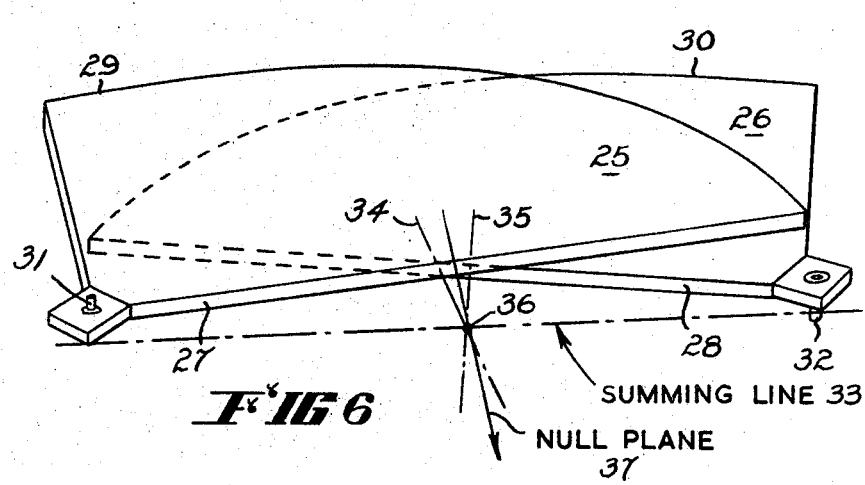
Figure 7:
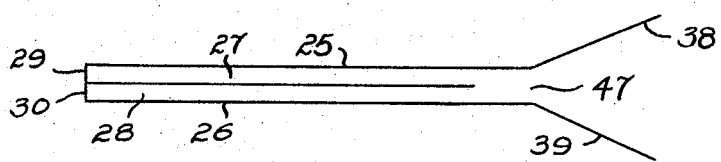
Figure 8:
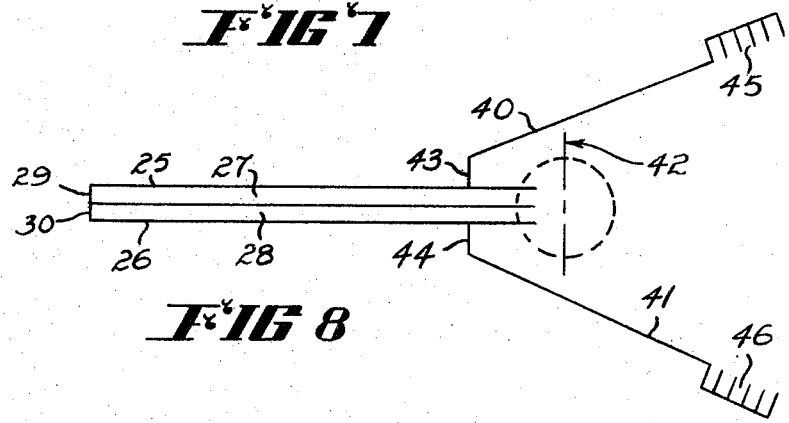

FIG. 6 shows a modified form a "cheese" aerial, using a quarter section with corner excitation, showing more particularly the offset effect, FIG. 7 shows in central longitudinal section the aerial of FIG. 6 but showing flares with the summining length before radiation, FIG. 8 is a view similar to FIG. 7, but showing how transverse isolating slots can be built into flares, showing the flares set back from the summing aperture, FIG. 9 shows how a localiser path can be intersected by a glide plane to maintain an aircraft on both its correct line of flight and at the correct height, which view should be related to FIG. 1, where this system is illustrated as applied to a runway of an aerodrome, but a system such as shown in FIG. 9 can extend completely along a flight path by positioning such systems as spaced intervals along the path, and FIGS. 10 and 11 show in elevation and plan respectively how a receiving aerial can conveniently be fitted into the transparent nose of an aircraft.

Referring first to the general scheme as adapted for use on an air strip as shown in FIG. 1 it will be noted that a pair of locaising aerials 1–2 are disposed well forward of the runway 3 on which the plane is to land, thus operating to radiate out a signal on each side of the glide path 4 which will keep the aircraft on a true line with the landing strip 3, and because the signal is generated at the approach end of the runway it will be realised that a strong signal results when the approach is being made, which signal will not significantly be effected by ground interference as would be the case if the signal were being transmitted from the further end of the runway or from some other remote position.

It is to be noted that a slot aerial system 5 comprising pairs of aerials is recommended at the actual touch down point 6, and such a system can be installed along the runways and turn-offs if this is required, but for normal purposes it is envisaged that a system of landing lights 7 may be more effective which could be switched in banks to apply to the particular runway and to any turn-off which is to be used. To ensure that such lines are visible to the pilot under fog or similar conditions of bad visibility, or in cases where visible light was not desirable, such as for military purposes, the light radiating sources can be in the invisible range such an infra-red and the necessary transducer used in the aircraft to clearly define the runway. This part of the guidance system forms no part of the present invention.

In FIG. 1 the glide plane, that is the plane governing height of the aircraft and which is directed across the localiser plane to cut it at correct height, is shown as being generated by a double cheese aerial located at 8 of this figure. This defines a navigation plane normal to the localiser plane and passing through the glide path. It is capable of defining the glide plane to the touch down of the aircraft when the magnetic line sources are suitably illuminated by a distribution approximating a cosine squared law. A frequency of about 5000 mc./s. is desirable, and the aerial aperture is then of the order of about 12 feet.

Note that the Fresnel region analysis of the apertures of uniform and cosine aperture distribution of excitation shows that the larger aperture of the latter provides in the near distance a confined radiation distribution much superior to the former which needs but half the aperture to produce the same width of beam. This near distance pattern is sufficiently good to bring the aerial position on the plane to a height of less than 25 feet, that is substantially to touch down.

In many cases this would be satisfactory without the use of an ancillary landing radio altimeter, particularly with light planes.

In FIG. 2 is shown how the system can be applied in an effective manner in difficult or mountainous terrain, and it will be noted in this figure that a series of pairs of radiator aerials 9 are used placed along the glide path so that it is unnecessary to have lengthy propagation of the glide signal as each of the stations along the glide path will give an indication of the position of the aircraft and the necessary strength of signal can thus be maintained over the required distance without problems occurring through beam distortion or reflections from ground objects.

The progressing aircraft passes from one set of signals to the next by capture effect.

By means of such a system, reflections from the main buildings of the aerodrome and in its proximity or from hills or structures along the flight route are avoided and higher angles of propagation to the course line are possible, enhancing the field strength at 50 ft. altitude by a factor exceeding 20:1 for a given aerial power.

A substantially square wave modulation conveniently about 10,000~/sec., alternatively switches the aerials 1 and 2, so only one aerial radiates at a time.

The difference between the two sets of pulses produced in a receiver flying off course is indicated in FIG. 2 and with linear detection readily defines the deviation from the source. Where the outputs of the demodulations are equal for the 150~/sec. and 90~/sec., the aircraft is on course.

The proposed localiser system can be detected by the existing aircraft receivers, as the 10,000 cycle modulation will pass through the I.F. channels unnoticed and the filters for the 150~/sec., and 90~/sec., modulation frequencies will remove it after the detection process.

All phasing problems are removed so long as the modulated carriers are detected by linear detectors, and balance on the course line.

Standard reception techniques and circuits are adequately described in Sandretto—Electronic Navigation Engineering—ITT Corporation 1958, FIGS. 14–19 and 14–43 and 14–44.

The magnitude of the detected signal will be the difference of the receiver signals multiplied by the receiver gain, as achieved by the automatic gain control.

If $k$ is the depth of modulation, this indication will be substantially proportional to:

$$\frac{k\left\{\sin\left(\frac{\phi}{2}+\theta+\frac{D\cos\theta}{R_1}\right)\frac{\pi}{2\phi}-\sin\left(\frac{\phi}{2}-\theta-\frac{D\cos\theta}{H_2}\right)\frac{\pi}{2\phi}\right\}}{\sin\left(\frac{\phi}{2}+\theta+\frac{D\cos\theta}{R_1}\right)\frac{\pi}{2\phi}+\sin\left(\frac{\phi}{2}-\theta-\frac{D\cos\theta}{R_2}\right)\frac{\pi}{2\phi}}$$

substantially proportioned that is to:

$$\frac{k\cos\frac{\pi}{4}\sin\left(\theta+\frac{D\cos\theta}{R}\right)\frac{\pi}{2\phi}}{\sin\frac{\pi}{4}\cos\left(\theta+\frac{D\cos\theta}{R}\right)\frac{\pi}{2\phi}}$$

wherein $R_1 \doteq R_2 \doteq R$ to 2% accuracy if $R < 5D$.

This is a sufficiently linear law for $$\left(\frac{D\cos\theta}{R}+\theta\right)\frac{\pi}{2\phi}<30°$$

i.e. the maximum error is approximately 5% and this would correspond to ⅔ of the angular width between the maximum differences of signals, i.e. $\theta=2\phi/3$.

The amplifier would normally be driven to saturation at about half this level, the needle being hard over indicating the need to go to the right or left.

Note, that localiser signals with a constant signal difference would be substantially hyperbolic, travelling as asymptotes at ranges exceeding a few thousand feet and the spacing of paths near landing due to the approximate hyperbolic paths manifesting themselves in a distinct advantage in defining paths on the runway displaced from the equi-signal path for signals off course.

Variations of the degree of overlap are possible, corresponding to $\phi$ less than one half of the angle between the nulls of major lobe of the radiation pattern of each aerial, and considerable variations from cosinusoidal major lobes are possible without appreciably affecting the applicability of the method.

The present 110 mc./s. localiser system is horizontally polarised and the proposals suggested above could be applied readily to horizontally polarised aerials.

As the normal flight path is at an elevation angle of less than 3°, this makes an efficient aerial system for the localiser system relatively high.

Normally, the transmitting loops are 7 ft. high with a maximum lobe to the radiation pattern at an elevation of 18°.

In FIGS. 3 and 4 a radiating aperture 20 is formed by the aerial wires 21.

Using the cheeses shown in FIGS. 5 to 8 it will be seen that each aerial of the pair comprises an upper aerial 25 and a lower aerial 26, the walls defining apertures 27 and 28 and having rear reflector walls 29 and 30 respectively so arranged in relation to the excitation members 31 and 32 for the two aerials that the correct wave direction from the apertures 27 and 28 results.

In FIG. 6 is shown an aerial system similar to that shown in FIG. 5 and therefore similar reference numerals are used but in this case corner excitation is used and the reflectors 29 and 30 which are associated with the excitation members 31 and 32 are arranged to give what I term "quarter cheeses," this form being ideally suitable as the excitation members are out of the line of fire from the two aerial cavities.

In this FIG. 33 represents the summing line and it is to be noted that the cheeses 29 and 30 are so positioned in relation to each other that their centre lines 34 and 35 pass through the point 36 which is forward of the apertures of the individual cheeses to produce the null plane 37 as illustrated.

In FIG. 7 flares 38 and 39 have been added to the aerials, the same reference numerals being again used as in FIGS. 5 and 6, but signals are added before reaching the radiating aperture, which is perpendicular to the null plane, in a cavity 47. In FIG. 8 a different system of flares is illustrated and in this figure the flares 40 and 41 are carried rearwardly of the summing line 42 and have sections 43 and 44 joining the flares 40 and 41 to the aerials 25 and 26, the outer ends of the flares 40 and 41 being provided with transverse slot cavities 45 and 46.

These aerials are preferably energised alternately so that as one is energised the other is terminated in a resistant load through a switched diode connection or the like so that as one of the aerial sections 25 or 26 radiates, the other is loaded so that it does not radiate a reflected signal received from the radiating aerial.

Thus as aerial number 1 is energised for its required time, aerial No. 2 resists rediation by being switched and loaded by a resistance under control of a diode or the like, and while aerial 2 is energised aerial number 1 is switched to resist radiation by the reflected signal.

Each of the aerial systems thus comprises two differently orientated pairs of aerials 25 and 26 and when a pair of these aerial systems are placed one on either side of the required flight path and angled so that the null planes of these two systems intersect, and fed and switched so that when the upper aerials on each side are energised, the lower aerials on the two sides are loaded to prevent radiation, and vice versa as alternate switching is effected, the clearly defined flight path is produced which as said can be extended indefinitely by using further aerial systems positioned to give the correct angle and altitude for the flight path at that particular location.

The system described is well suited to all cases where the land is rough and elevated beyond the rim of the aerodrome and the antennae just described turned through 90° and uptilted 1 in 20, may be used off-set as for the present glide system with the advantage that the glide path down to 20 ft. altitude could be plane (owing to the 5000 mc./s. antennae being only 8 to 12 feet across) and above 150 ft., or any other convenient altitude, the glide could be developed by the system described above using intersecting equi-signal planes.

Note further, at points where the glide path is regenerated, it will generally prove necessary in practice to regenerate the localiser signal to ensure the boundary planes, beyond which the glide path receiver is cut off, are regenerated. This is not likely to occur in hilly country remote from the aerodrome.

To summarise:

The localiser system described has immediate application without appreciable modification of existing aircraft localiser transmitters and receivers to greatly improve the localiser signals in the difficult stages of landing from 200 ft. to 20 ft. altitudes, moreover, this superior performance is maintained at distant points.

The integrated glide path system allows for regeneration of the glide path near areas of elevated country, where the normal glide path would suffer serious error due to ground scatter.

Further, the provision of elevated paths for vertical take-off aircraft presents no difficulty.

Obviously by means of a system such as described herein the paths can be varied, such as by bending the compound flight paths, for instance the angle of each of the generating systems through which the path extends may be changed, these advantages ensuring that by use of such multiple aerial systems any desired pattern is possible and moreover this may be achieved with relatively simple apparatus and without having to resort to large structures, the use of the multiple units also removing problems which exist where lengthy paths must be generated such as ground scatter and the like, a problem which in the past caused much trouble due to the impossible exacting requirement of the terrain with respect to level and uniformity.

It will thus be realised that according to this invention pairs of aerials are used, each aerial of the pair comprising two transmission units which have their apertures and signal so arranged that a null plane is produced by each which can be both directed and orientated and shaped, so that, when the signals of each pair intersect, a flight path is defined which can be selected to pass well above the aerial system itself, allowing its use even at high altitudes, and which can be so directed and defined that with straight or slightly curved paths a series of these flight paths can extend end to end with fresh generating points along their length to allow a strong flight path to be defined over any required distance.

FIG. 9 shows a simple system suited to most undulating country and permitting a very simple glide path receiver to be used.

In this figure is shown how a glide plane can be projected across the localiser plane, this view being in perspective and showing firstly how long wave aerials 60 and 61 generate the localiser plane, the dotted lines 62 showing the limits of localiser operation as previously, the glide plane radiation being shown by the lines 63 and being generated at the aerial source 8 placed sufficiently far from the actual glide path to ensure that the angles with which the glide plane signal intercepts the localiser signal is at a low angle of say not more than 1 in 10, this slight angle being immaterial so far as the received signal is concerned.

The only precaution required here for a plane travelling along the localiser path from right to left are means to cut off the glide path receiver at the appropriate localiser signal level, say by a saturation signal.

Simple circuitry could be used to achieve this, namely the peak modulation signal representing the "go right" instruction could be used with isolating amplification and with a switch such as a Zener diode to flag or switch off the glide path indication.

Clearly with a philosophy that emphasizes localiser position, and keeps it sharp and reliable at great distances from touch down, such a system will give adequate glide information, which can be regenerated along the path as the topography requires.

It will be realised of course that the number of glide plane signals could be generated along the path of the localiser plane and it would for instance be possible to generate normal approach glide paths at certain altitudes governed purely by the intersection of the glide plane signal with the localiser signal and to change the angle of glide along the localiser plane and in the case of helicopters and similar aircraft a substantially vertical signal could be used at the final landing site so that as the aircraft moves along the localiser plane the angle can change so that the aircraft is brought down quickly on to the tarmac by this special steeper glide plane.

In FIGS. 10 and 11 is shown a suitable receiving aerial which can be fitted into the nose of an aircraft in a highly advantageous position yet which will take up a very small space when used with the frequency generally involved in the present system.

The aerial, which is fitted into the nose 80 of an aircraft, comprises a cavity 81 formed between a pair of walls 82, the cavity having an opened front 83 and a rear reflector 84 which is a parabolic form and directs a received signal to the focus 85 from whence the signal is transferred by means of the wave guide 86 to the local oscillator and mixer which can conveniently be housed in the chamber 87 of the aerial.

Such an aerial can have relatively small dimensions such as an aerial of 14" with a depth of perhaps 4" and a breadth of under an inch as the cavity 81 need only be very narrow, and as the aerial is disposed in the curvature of the nose of the plane it will be realised that it forms little or no obstruction and also it is near to the general site of the equipment and therefore lends itself readily to coupling to the radio navigation equipment by light concentric tube cable which need only carry the I.F. frequency.

In conclusion, it may be pointed out that monitoring of the system has been considered, and this system presents no new problems.

It should also be noted that in the case of slot aerials, dumbell slots may be used as these are small in physical size, even as short as λ/10 if capacity loaded, and their heating under icing condition presents no problems.

What I claim is:

1. An aerial system for guiding aircraft in relation to aerodromes comprising first and second electromagnetic generating means, one of said means being arranged to generate a localizer plane and the other of said means being arranged to generate a glide plane which together with the localiser plane is regenerated at points remote from the aerodrome to redraw the glide path line on the regenerated localizer plane, the said glide plane having cross slopes in planes perpendicular to the localizer plane not exceeding a slope ratio of one in ten, each said means being cooperatively effective to provide a capture effect between its regenerated signals and thereby provide a transition between original and regenerated navigation planes.

2. A system as claimed in claim 1 comprising an airborne glide path receiver cut off in localizer zones of the locally regenerated planes which give saturation indication in the localizer receiver and thereby exclude the cross slope glide plane from being navigated by the glide path receiver at dangerously low levels.

3. An aerial system for guiding aircraft in relation to aerodromes as claimed in claim 1, said one means including means whereby the localizer plane is generated beyond the glide plane generation points whereby to extend the localizer plane to greater distance than is required by the glide plane.

References Cited

UNITED STATES PATENTS

| | | | |
|---|---|---|---|
| 2,513,338 | 7/1950 | Litchford et al. | 343—109 |
| 2,526,675 | 10/1950 | Litchford | 343—108 |
| 2,576,943 | 12/1951 | Jenks | 343—107 |
| 2,602,161 | 7/1952 | Proskauer | 343—107 |
| 2,952,845 | 7/1960 | Begovich et al. | 343—108 |
| 3,160,369 | 12/1964 | Edmison | 343—108X |
| 3,182,328 | 5/1965 | Hings | 343—107X |

FOREIGN PATENTS

| | | | |
|---|---|---|---|
| 858,607 | 6/1941 | France | 343—108 |

RODNEY D. BENNETT, JR., Primary Examiner

T. H. TUBBESING, Assistant Examiner

U.S. Cl. X.R.

343—107